(12) United States Patent
Watson et al.

(10) Patent No.: US 6,757,132 B1
(45) Date of Patent: Jun. 29, 2004

(54) DISK DRIVE COMPRISING A SNAP-ON DISK CLAMP

(75) Inventors: Scott E. Watson, San Jose, CA (US); Peter G. Robinson, Aptos, CA (US); Aaron D. Little, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 365 days.

(21) Appl. No.: 09/751,898

(22) Filed: Dec. 27, 2000

(51) Int. Cl.[7] ............................................. G11B 17/022
(52) U.S. Cl. ................................................... 360/99.12
(58) Field of Search ........................... 360/99.12, 99.05, 360/98.08; 310/91

(56) References Cited

U.S. PATENT DOCUMENTS

| | | | | |
|---|---|---|---|---|
| 5,243,481 A | * | 9/1993 | Dunckley et al. | 360/99.08 |
| 5,267,106 A | * | 11/1993 | Brue et al. | 360/98.08 |
| 5,590,004 A | * | 12/1996 | Boutaghou | 360/99.12 |
| 5,712,746 A | | 1/1998 | Moir et al. | 360/98.08 |
| 5,790,346 A | | 8/1998 | Fletcher | 360/99.12 |
| 5,872,681 A | | 2/1999 | Boutaghou | 360/99.12 |
| 5,877,571 A | * | 3/1999 | Brooks | 360/99.12 |
| 5,940,244 A | | 8/1999 | Canlas et al. | 360/99.08 |
| 6,040,649 A | * | 3/2000 | Horng | 310/91 |
| 6,055,123 A | * | 4/2000 | Kazmierczak et al. | 360/98.08 |
| 6,172,844 B1 | * | 1/2001 | Luo et al. | 360/98.08 |
| 6,212,031 B1 | * | 4/2001 | Kazmierczak et al. | 360/98.08 |
| 6,430,002 B1 | * | 8/2002 | Voights | 360/99.12 |
| 6,504,673 B2 | * | 1/2003 | Choo et al. | 360/98.08 |

* cited by examiner

Primary Examiner—Tianjie Chen
(74) Attorney, Agent, or Firm—Won Tae C. Kim, Esq.; Milad G. Shana, Esq.; Howard H. Sheerin, Esq.

(57) ABSTRACT

A disk drive is disclosed comprising a head, a spindle motor having a hub, the hub comprising a cylindrical shaft, the shaft defining a generally cylindrically-shaped outer surface, the outer surface defining a latching member extending around at least part of the circumference of the shaft. A disk is positioned on the spindle motor and an actuator moves the head radially over the disk. A disk clamp clamps the disk to the spindle motor. The disk clamp comprises a ring-shaped body comprising an outer ring-shaped surface abutting the disk, and an inner neck spaced-apart from the outer ring-shaped surface, the inner neck comprising a plurality of independently flexing teeth for contacting the latching member.

20 Claims, 6 Drawing Sheets

DISK DRIVE COMPRISING A SNAP-ON DISK CLAMP

BACKGROUND OF THE INVENTION

1. Field of the Invention

The present invention relates to disk drives for computer systems. More particularly, the present invention relates to a disk drive comprising a snap-on disk clamp.

2. Description of the Prior Art

Computer systems typically comprise a disk drive comprising one or more disks rotated about a center axis by a spindle motor, and a head actuated radially over the surface of the disk by a voice coil motor. The surface of the disk is coated with a magnetic material which is magnetized by the head in order to record digital data on the disk. The digital data modulates a current in a write coil of the head in order to write magnetic transitions representing the recorded data in concentric, radially spaced tracks. During read back, the head senses the magnetic transitions to generate an analog read signal comprising pulses representing the recorded digital data, wherein the pulses are demodulated into digital data transmitted to the host computer system.

The ability to accurately recover the recorded data is affected by several factors, including distortion (e.g., warping) of the disk as well as disk slippage. Disk warping can cause head fly height variations and distort the pre-written servo pattern, and disk slippage can degrade the servo system's ability to maintain proper centerline tracking. It is therefore desirable to clamp the disk to the spindle motor in a manner that minimizes disk warping and disk slipping.

A ring-shaped disk clamp has been employed in prior art disk drives which is screwed onto the hub of the spindle motor by inserting screws through apertures in the disk clamp and fastening the screws to the hub of the spindle motor. The screws and associated fastening force are sparsely distributed around the circumference of the disk clamp (e.g., using six screws) which creates an uneven clamping force on the disk resulting in disk warping. In addition, the screws and associated apertures increase the manufacturing cost of the disk drive.

U.S. Pat. No. 5,940,244 discloses a shrink-fit disk clamp for a disk drive wherein a ring is expanded through heating, applied over the hub of the spindle motor onto the disk, and then cooled in order to shrink-fit the ring onto the hub. Shrink-fitting the disk clamp onto the hub provides a more evenly distributed clamping force on the disk as compared to the screw-down disk clamps. However, heating and cooling the disk clamp in order to achieve the desired shrink-fit installation requires expensive tooling and requires a cooling step during manufacture of the disk drive.

There is, therefore, a need for a more cost effective disk clamp for use in a disk drive which provides sufficient clamping force to minimize disk slippage as well as an evenly distributed clamping force to minimize disk warping.

SUMMARY OF THE INVENTION

The present invention may be regarded as a disk drive comprising a head, a spindle motor having a hub, the hub comprising a cylindrical shaft, the shaft defining a generally cylindrically-shaped outer surface, the outer surface defining a latching member extending around at least part of the circumference of the shaft. A disk is positioned on the spindle motor and an actuator moves the head radially over the disk. A disk clamp clamps the disk to the spindle motor. The disk clamp comprises a ring-shaped body comprising an outer ring-shaped surface abutting the disk, and an inner neck spaced-apart from the outer ring-shaped surface, the inner neck comprising a plurality of independently flexing teeth for contacting the latching member.

In one embodiment, the latching member comprises a groove extending around at least part of the circumference of the shaft, and each of the teeth comprise a tab inserted into the groove. In another embodiment, the latching member of the shaft comprises a protruding ridge extending around at least part of the circumference of the shaft, and each of the teeth comprises a groove interacting with the protruding ridge.

The present invention may also be regarded as a disk clamp for clamping a disk to a spindle motor of a disk drive. The spindle motor comprises a hub, the hub comprises a cylindrical shaft, the shaft defining a generally cylindrically-shaped outer surface, the outer surface defining a latching member extending around at least part of the circumference of the shaft. The disk clamp comprises a ring shaped body comprising an outer ring-shaped surface abutting the disk, and an inner neck spaced-apart from the outer ring-shaped surface, the inner neck comprising a plurality of independently flexing teeth for contacting the latching member.

DESCRIPTION OF THE PREFERRED EMBODIMENTS

Figure 1:
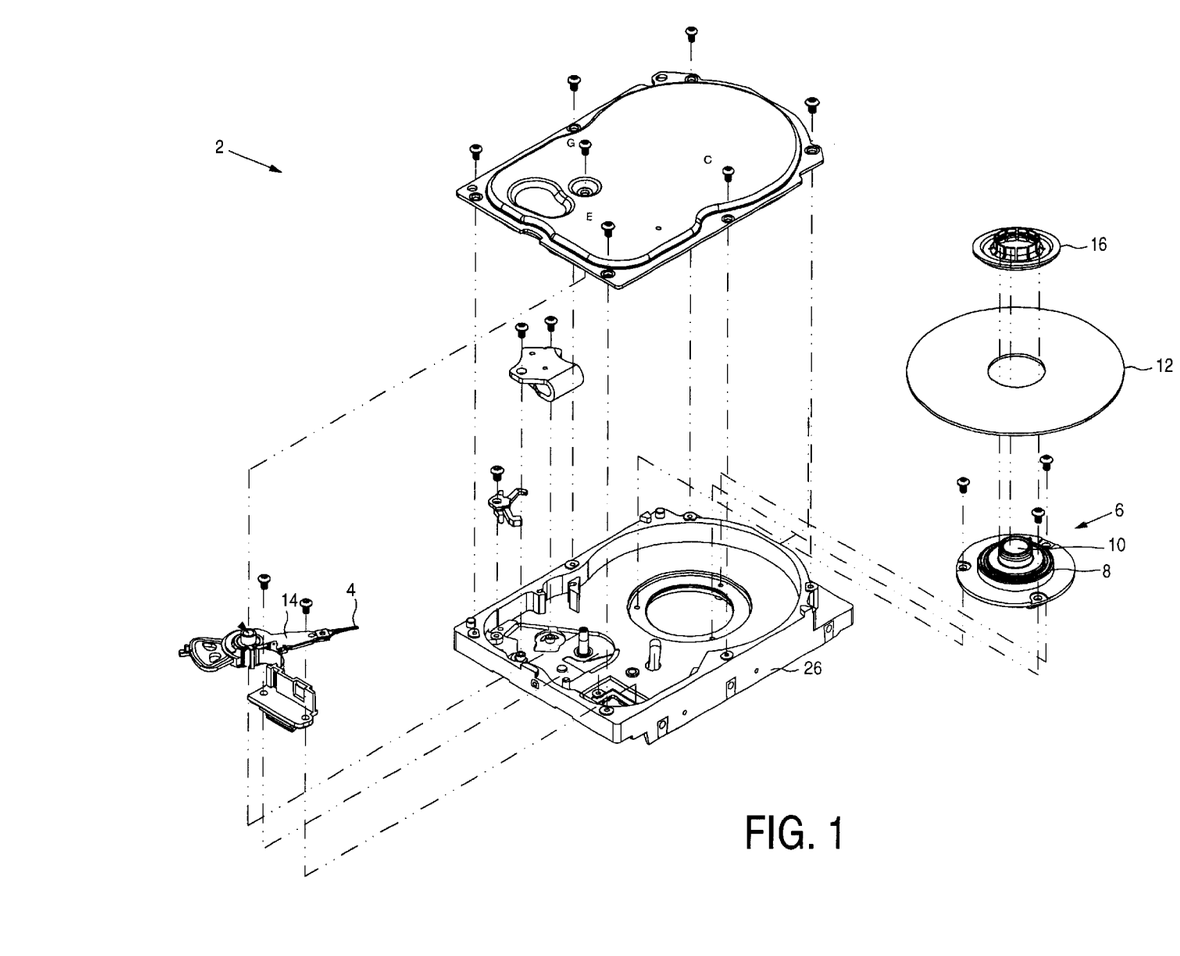
FIG. 1 is an exploded view of a disk drive comprising a snap-on disk clamp for clamping a disk to a spindle motor according to an embodiment of the present invention.

FIG. 1 shows a disk drive 2 according to an embodiment of the present invention as comprising a head 4, a spindle motor 6 having a hub 8, the hub 8 comprising a cylindrical shaft 10, the shaft 10 defining a generally cylindrically-shaped outer surface 27 (FIG. 2), the outer surface 27 defining a latching member extending around at least part of the circumference of the shaft 10. A disk 12 is positioned on the spindle motor 6 and an actuator 14 moves the head 4 radially over the disk 12. A disk clamp 16 clamps the disk 12 to the spindle motor 6. The disk clamp 16 comprises a ring-shaped body comprising an outer ring-shaped surface abutting the disk 12, and an inner neck spaced-apart from the outer ring-shaped surface, the inner neck comprising a plurality of independently flexing teeth for contacting the latching member.

The disk drive 2 of FIG. 1 further comprises a base 26 and a printed circuit board assembly (not shown) attached to the base 26.

Figure 2:
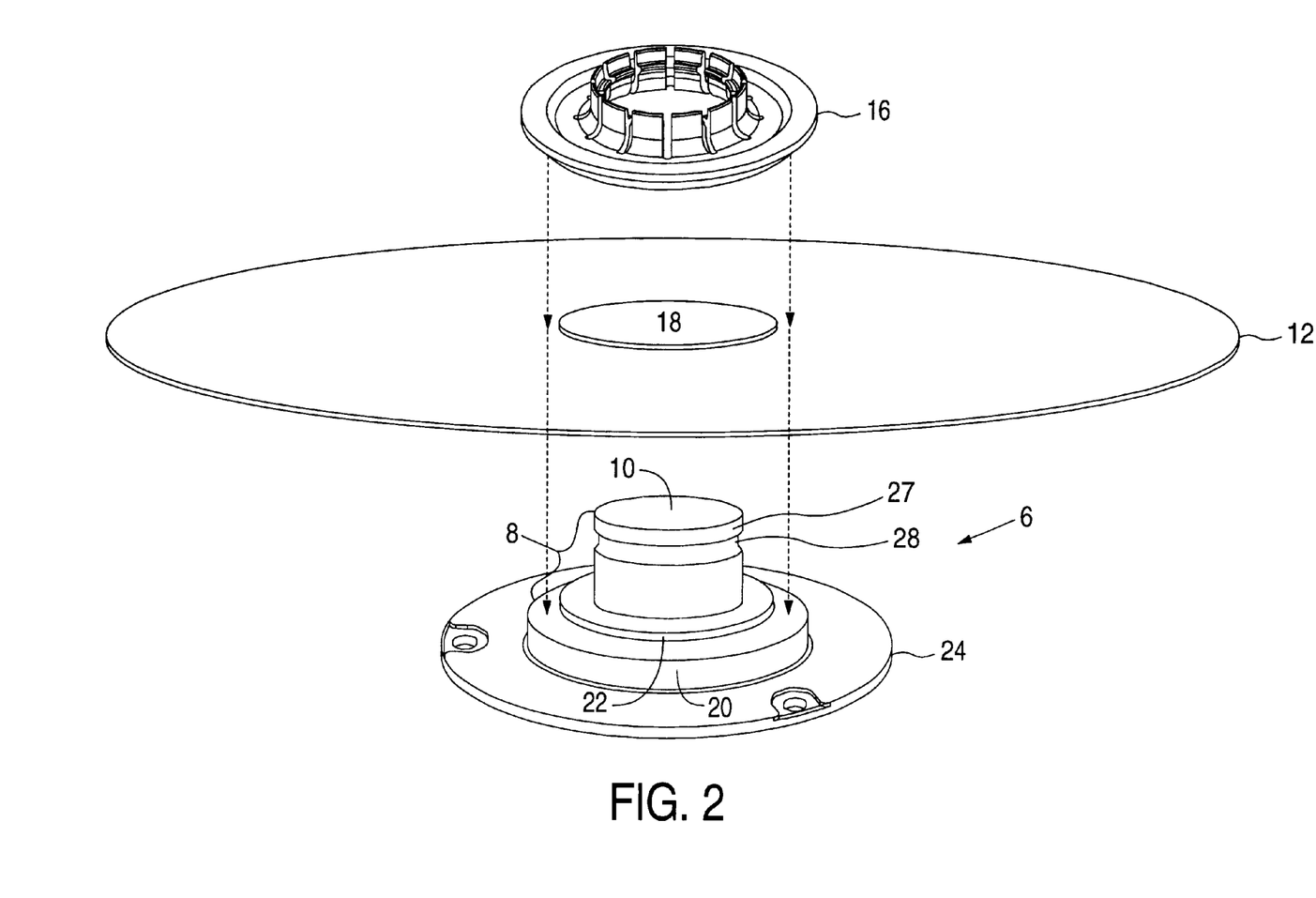
FIG. 2 shows details of the installation of the snap-on disk clamp onto the hub of the spindle motor.

FIG. 2 shows further details of the disk 12, the spindle motor 6, and the disk clamp 16. The disk 12 is placed onto the spindle motor 6 such that the shaft 10 of the spindle motor hub is disposed axially through a centric, circular opening 18 of the disk 12. An inner diameter of the disk 12 rests on a flange 20 of the spindle motor 6. The centric circular opening 18 of the disk 12 is positioned to find and seat into a raised circular surface 22 of the spindle motor 6, thereby centering and stabilizing the disk 12. The disk clamp 16 is slid over and then attached to the shaft 10 of the spindle motor hub 8. The outer ring-shaped surface of the disk clamp 16 presses against the inner diameter of the disk 12 to provide an axial clamping force on the disk 12. The shaft 10, flange 20, and raised circular surface 22 constitute the spindle motor hub 8 which rotates about the axis of the shaft 10, thereby rotating the disk 12. The spindle motor hub 8 rotates on a fixed circular plate 24 which is attached to the base 26 of the disk drive 2 (e.g., using screws). In the embodiment shown in FIG. 2, the latching member of the shaft 10 comprises a groove 28 formed around the circumference of the shaft 10 of the spindle motor hub 8, and the disk clamp 16 interacts with the groove 28.

Figure 3A:
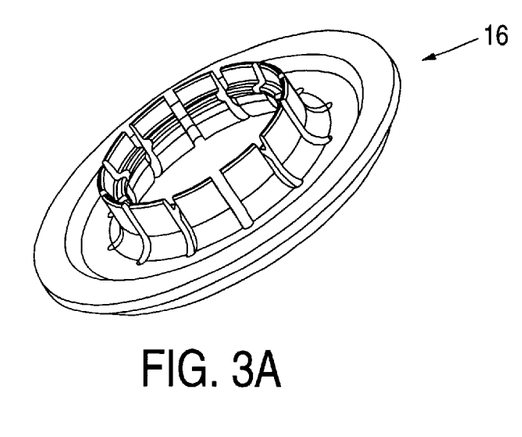
FIG. 3A shows a perspective view of an embodiment of the snap-on disk clamp.
Figure 3B:
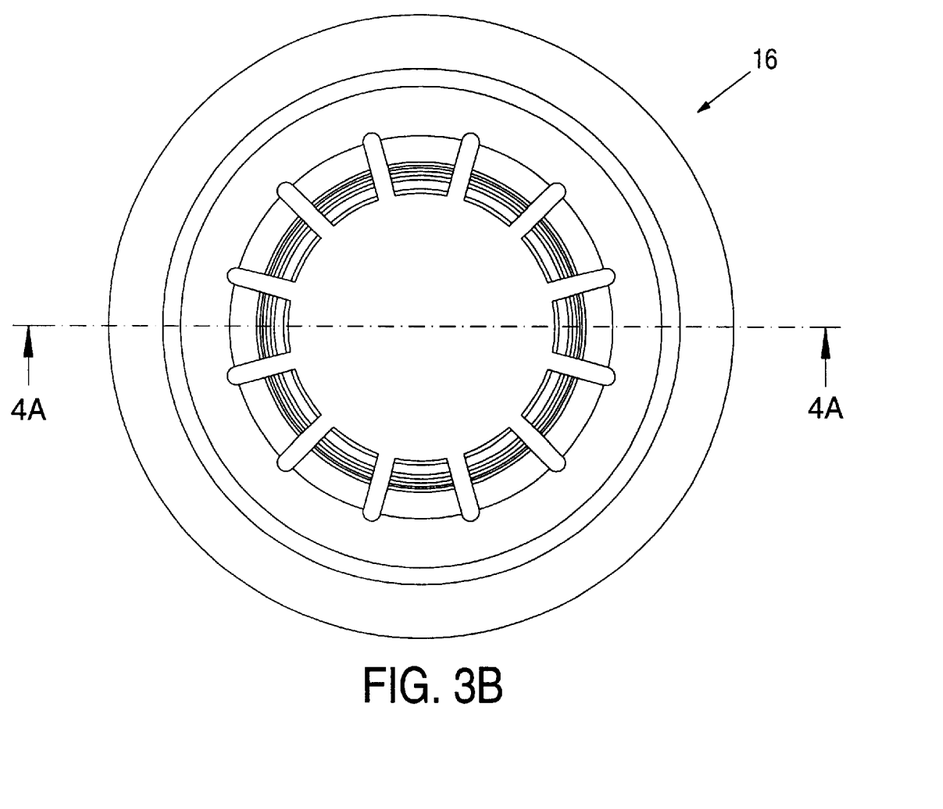
FIG. 3B shows a top view of the snap-on disk clamp of FIG. 3A.
Figure 4A:
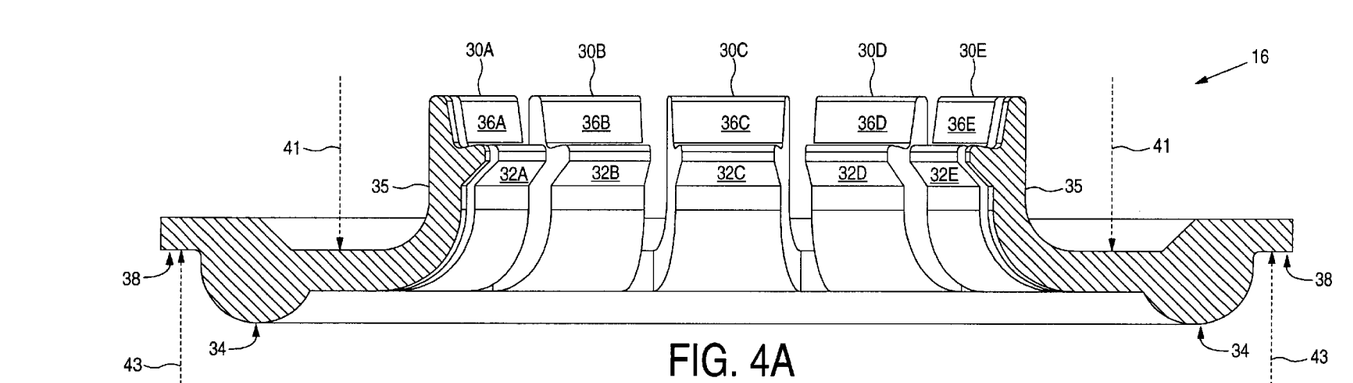
FIG. 4A shows a cross-sectional view of the snap-on disk clamp of FIG. 3B as comprising a plurality of independently flexing teeth comprising a plurality of tabs formed on the interior surface of the teeth.
Figure 4B:
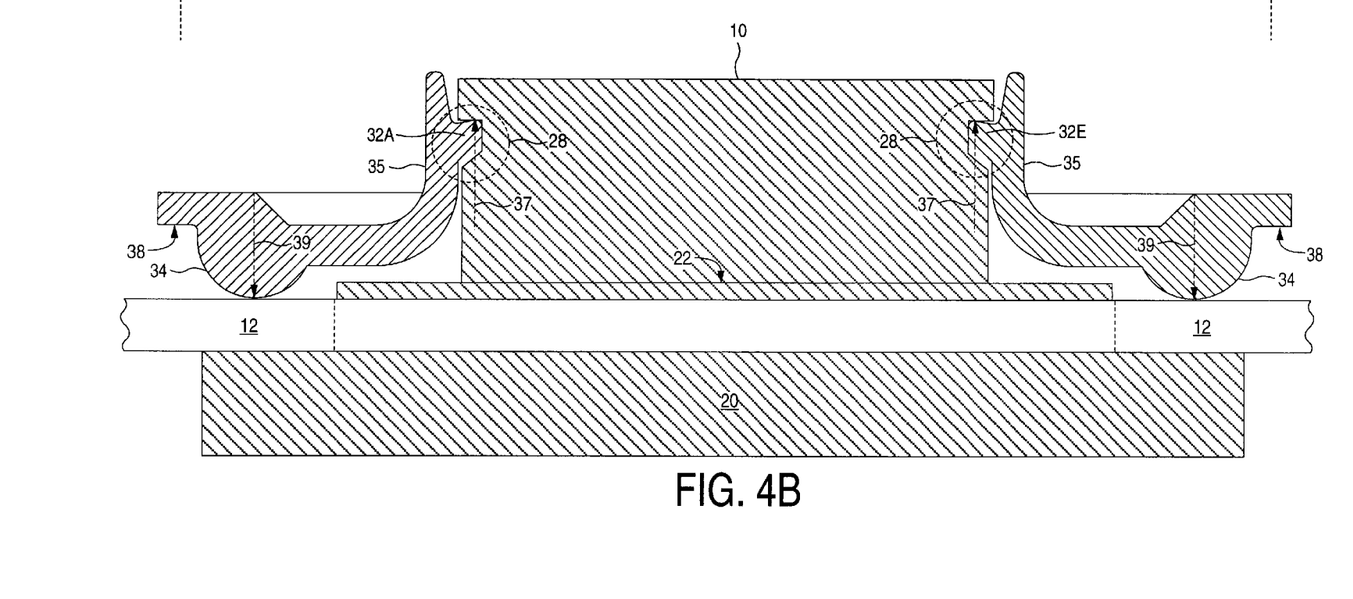
FIG. 4B shows a cross-sectional view of the snap-on disk clamp as installed on a hub of the spindle motor, wherein the tabs of the teeth are inserted into a groove formed around a shaft of the spindle motor hub.

FIG. 3A shows a perspective view of a disk clamp 16 according to an embodiment of the present invention. FIG. 3B shows a top view of the disk clamp 16, and FIG. 4A shows a cross-sectional view of the disk clamp 16 along the horizontal axis of FIG. 3B. FIG. 4B is a cross-sectional view of the disk clamp 16 of FIG. 3A as installed on the hub 8 of the spindle motor 6. In the embodiment of FIG. 4A and 4B, the disk clamp 16 comprises a plurality of independently flexing teeth 30A–30E each comprising a tab 32A–32E for insertion into the groove 28 around the circumference of the cylindrical shaft 10 of the spindle motor hub 8. The disk clamp 16 comprises an outer ring-shaped surface 34 which abuts the disk 12. In one embodiment, the outer ring-shaped surface 34 comprises a curved-shaped surface for providing a more evenly distributed clamping force on the disk 12.

As shown in FIGS. 4A–4B, the neck 35 of the disk clamp 16 comprises a substantially curved-shape extending from a top of the neck 35 to the outer ring-shaped surface 34 abutting the disk 12. With the tabs 32A–32E inserted into the groove 28 of the shaft 10 and pressing against a top surface of the groove 28, a vertical force 37 stresses the curved-shaped surface of the neck 35 creating an axial clamping force 39 on the disk 12. Because the tabs 32A–32E of the teeth 30A–30E are distributed in a substantially continuous ring around the shaft 10, it results in a substantially evenly distributed clamping force 39 on the disk 12 as compared to the prior art disk clamps which are screwed onto the spindle motor hub 8 with screws spaced apart around the circumference of the disk clamp.

In the embodiment of FIG. 4A, the teeth 30A–30E of the disk clamp 16 each comprise a crown member 36A–36E for use in deflecting the teeth 30A–30E away from the shaft 10 of the spindle motor hub 8 when installing (or removing) the disk clamp 16 during manufacture of the disk drive. The disk clamp 16 also comprises a circumferential rim 38 adjacent the raised curve surface 34, the circumferential rim 38 defining a preload surface for an insertion tool used to install the disk clamp 16 during manufacture of the disk drive. The insertion tool (not shown) holds the disk clamp 16 by the rim 38 and applies a preload force 41 around the circumference of the disk clamp 16. The rim 38 pressing against the insertion tool creates a vertical preload force 43 on the disk clamp 16. The insertion tool further employs a spreading mechanism to flex the teeth 30A–30E away from the shaft 10 so that the disk clamp 16 can slide easily over the shaft 10 and placed onto the disk 12. The insertion tool then releases the crown members 36A–36E so that the tabs 32A–32E snap into the groove 28 of the shaft 10. When the insertion tool is removed, the tabs 32A–32E press against a top surface of the groove 28 with vertical force 37 creating the axial clamping force 39 on the disk 12. Pre-loading the disk clamp 16 with an insertion tool helps prevent damage to the spindle motor bearings when installing the disk clamp 16.

Figure 5A:
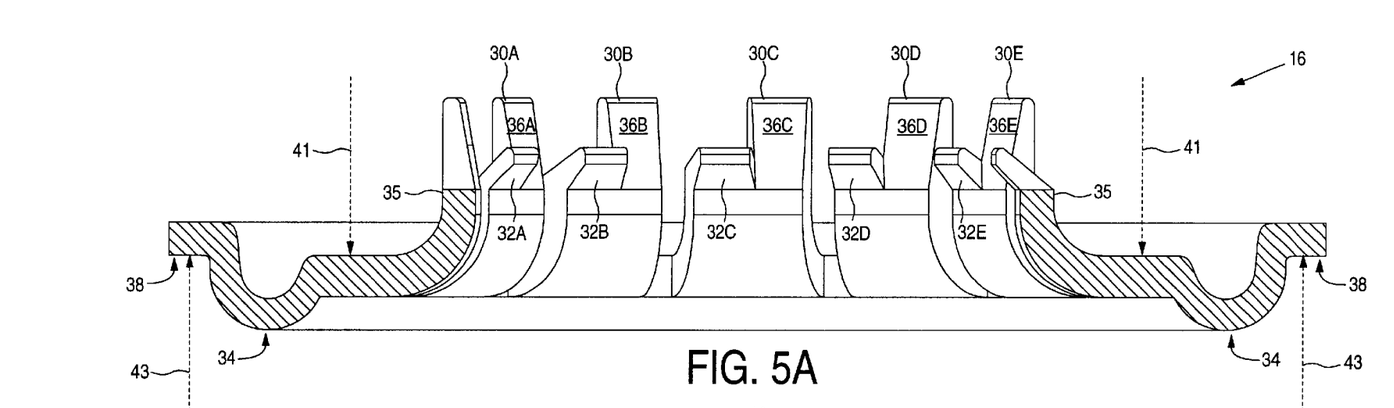
FIG. 5A shows a cross-sectional view of a snap-on disk clamp according to an alternative embodiment of the present invention, wherein the teeth of the snap-on disk clamp comprise tabs formed from a stamped metal process.
Figure 5B:
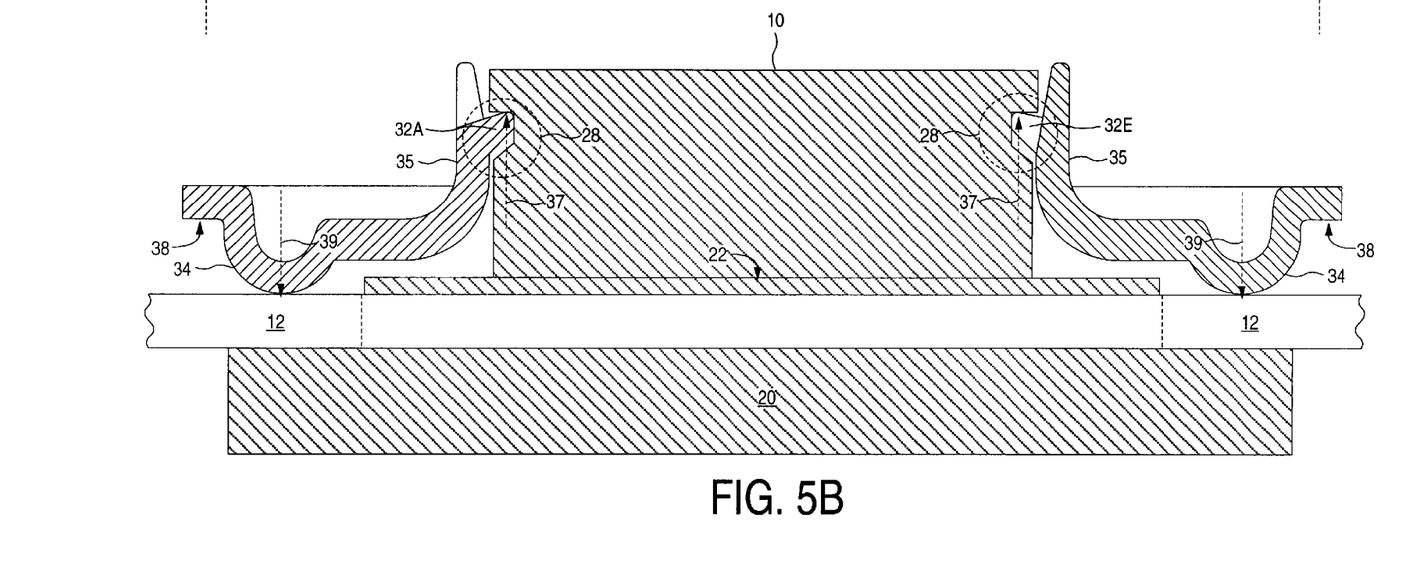
FIG. 5B shows a cross-sectional view of the snap-on disk clamp of FIG. 5A as installed on the spindle motor hub, wherein the tabs are inserted into a groove formed around the shaft of the spindle motor hub.

The disk clamp 16 of FIG. 4A may comprise any suitable material, such as injected molded plastic. FIG. 5A shows a cross-sectional view of an alternative embodiment of the disk clamp 16 stamped from a single piece of metal (e.g., aluminum or steel). In this embodiment, the tabs 32A–32E are formed by cutting the teeth 30A–30E in half vertically and bending the first half of the teeth inward toward the center of the disk clamp 16. The second half of the teeth 30A–30E (the unbent portion) constitute the crown members 36A–36E for spreading the teeth using the insertion tool during manufacture of the disk drive. The thickness of the disk clamp 16 is substantially constant facilitating the stamping of a uniform piece of metal. FIG. 5B shows a cross-sectional view of the disk clamp 16 of FIG. 5A as installed on the spindle motor hub 8 with the tabs 32A–32E inserted into the groove 28 of the shaft 10. The cross-sectional view of FIG. 5A and FIG. 5B is slightly below the centerline shown in FIG. 3B.

Figure 6A:
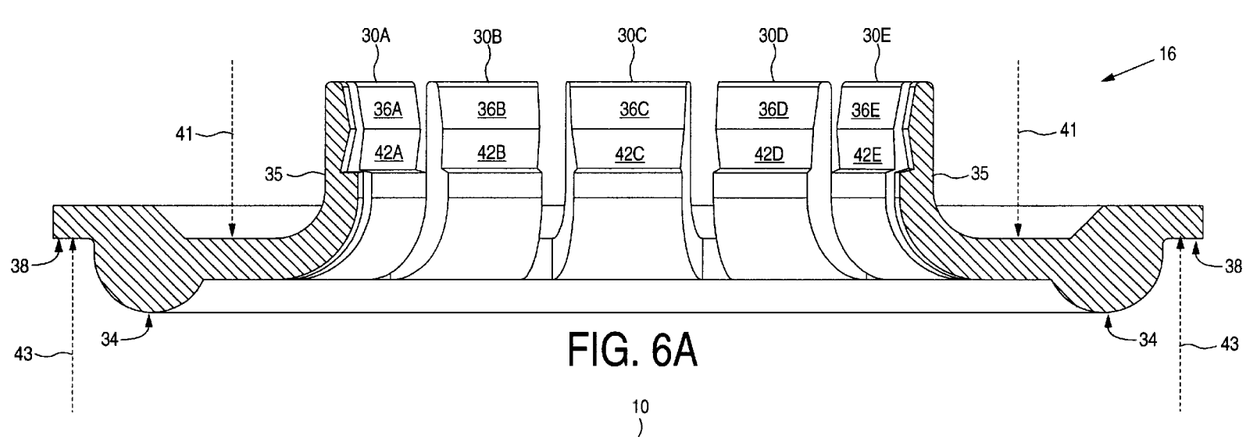
FIG. 6A shows a cross-sectional view of a snap-on disk clamp according to an alternative embodiment of the present invention, wherein the teeth of the snap-on disk clamp comprise a groove.
Figure 6B:
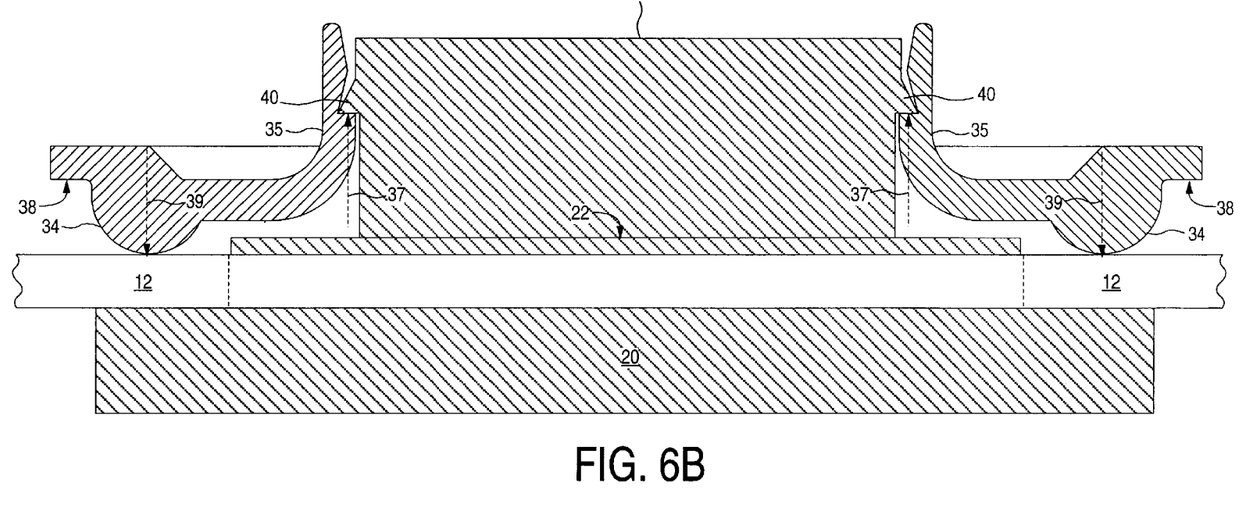
FIG. 6B shows a cross-sectional view of the snap-on disk clamp of FIG. 6A as installed on he spindle motor hub, wherein the grooves of the teeth interact with a ridge formed around the shaft of the spindle motor hub.

FIG. 6A shows a cross-sectional view of a disk clamp 16 according to an alternative embodiment of the present invention. FIG. 6B shows a cross-sectional view of the disk clamp 16 of FIG. 6A as installed on the spindle motor hub 8. In this embodiment, the latching member of the shaft 10 comprises a protruding ridge 40 extending around at least part of the circumference of the shaft 10, and each of the teeth 30A–30E comprise a groove 42A–42E interacting with the protruding ridge 40. This embodiment may comprise any suitable material, such as injection molded plastic or a stamped metal (e.g., aluminum or steel), wherein the stamped metal embodiment of the disk clamp 16 may comprise a substantially constant thickness similar to the embodiment of FIG. 5A.

We claim:

1. A disk drive comprising:
   (a) a head;
   (b) a spindle motor having a hub, the hub comprising a cylindrical shaft and a flange, the shaft defining a generally cylindrically-shaped outer surface, the outer surface defining a latching member extending around at least part of the circumference of the shaft;
   (c) a disk positioned on the flange;

(d) an actuator for moving the head radially over the disk; and (e) a disk clamp for clamping the disk to the spindle motor, the disk clamp comprising a ring-shaped body comprising an outer ring-shaped surface, and an inner neck spaced-apart from the outer ring-shaped surface, wherein:
the inner neck comprising a plurality of independently flexing teeth for contacting the latching member;
the outer ring-shaped surface providing an axial clamping force for clamping the disk to the flange; and
each of the teeth comprises a crown member for use in deflecting the teeth away from the shaft when installing the disk clamp during manufacture of the disk drive.

2. The disk drive as recited in claim 1, wherein:
(a) the latching member comprises a groove extending around at least part of the circumference of the shaft; and
(b) each of the teeth comprises a tab inserted into the groove.

3. The disk drive as recited in claim 1, wherein:
(a) the latching member of the shaft comprises a protruding ridge extending around at least part of the circumference of the shaft; and
(b) each of the teeth comprises a groove interacting with the protruding ridge.

4. The disk drive as recited in claim 1, wherein the outer ring-shaped surface abutting the disk comprises a raised curve surface.

5. The disk drive as recited in claim 4, wherein the ring-shaped body further comprises a circumferential rim adjacent the raised curve surface, the circumferential rim providing a latching surface for an insertion tool used to install the disk clamp during manufacture of the disk drive.

6. A disk clamp for clamping a disk to a spindle motor of a disk drive, the spindle motor comprising a hub, the hub comprising a cylindrical shaft and a flange, the shaft defining a generally cylindrically-shaped outer surface, the outer surface defining a latching member extending around at least part of the circumference of the shaft, the disk clamp comprising a ring shaped body comprising:
(a) an outer ring-shaped surface; and
(b) an inner neck spaced-apart from the outer ring-shaped surface, wherein:
the inner neck comprising a plurality of independently flexing teeth for contacting the latching member;
the outer ring-shaped surface providing an axial clamping force for clamping the disk to the flange; and
each of the teeth comprises a crown member for use in deflecting the teeth away from the shaft when installing the disk clamp during manufacture of the disk drive.

7. The disk clamp as recited in claim 6, wherein:
(a) the latching member comprises a groove extending around at least part of the circumference of the shaft; and
(b) each of the teeth comprises a tab inserted into the groove.

8. The disk clamp as recited in claim 6, wherein:
(a) the latching member of the shaft comprises a protruding ridge extending around at least part of the circumference of the shaft; and
(b) each of the teeth comprises a groove interacting with the protruding ridge.

9. The disk clamp as recited in claim 6, wherein the outer ring-shaped surface abutting the disk comprises a raised curve surface.

10. The disk clamp as recited in claim 9, wherein the ring-shaped body further comprises a circumferential rim adjacent the raised curve surface, the circumferential rim providing a latching surface for an insertion tool used to install the disk clamp during manufacture of the disk drive.

11. A disk drive comprising:
(a) a head;
(b) a spindle motor having a hub, the hub comprising a cylindrical shaft and a flange, the shaft defining a generally cylindrically-shaped outer surface, the outer surface defining a latching member extending around at least part of the circumference of the shaft;
(c) a disk positioned on the flange;
(d) an actuator for moving the head radially over the disk; and
(e) a disk clamp for clamping the disk to the spindle motor, the disk clamp comprising a ring-shaped body comprising an outer ring-shaped surface, and an inner neck spaced-apart from the outer ring-shaped surface, wherein:
the inner neck comprising a plurality of independently flexing teeth for contacting the latching member;
the outer ring-shaped surface providing an axial clamping force for clamping the disk to the flange; and
the neck of the disk clamp comprises a substantially curved shape extending from a top of the neck to the outer ring-shaped surface abutting the disk.

12. The disk drive as recited in claim 11, wherein:
(a) the latching member comprises a groove extending around at least part of the circumference of the shaft; and
(b) each of the teeth comprises a tab inserted into the groove.

13. The disk drive as recited in claim 11, wherein each of the teeth comprises a crown member for use in deflecting the teeth away from the shaft when installing the disk clamp during manufacture of the disk drive.

14. The disk drive as recited in claim 11, wherein the outer ring-shaped surface abutting the disk comprises a raised curve surface.

15. The disk drive as recited in claim 14, wherein the ring-shaped body further comprises a circumferential rim adjacent the raised curve surface, the circumferential rim providing a latching surface for an insertion tool used to install the disk clamp during manufacture of the disk drive.

16. A disk clamp for clamping a disk to a spindle motor of a disk drive, the spindle motor comprising a hub, the hub comprising a cylindrical shaft and a flange, the shaft defining a generally cylindrically-shaped outer surface, the outer surface defining a latching member extending around at least part of the circumference of the shaft, the disk clamp comprising a ring shaped body comprising:
(a) an outer ring-shaped surface; and
(b) an inner neck spaced-apart from the outer ring-shaped surface, wherein:
the inner neck comprising a plurality of independently flexing teeth for contacting the latching member;
the outer ring-shaped surface providing an axial clamping force for clamping the disk to the flange; and
the neck comprises a substantially curved shape extending from a top of the neck to the outer ring-shaped surface abutting the disk.

17. The disk clamp as recited in claim 16, wherein:
 (a) the latching member comprises a groove extending around at least part of the circumference of the shaft; and
 (b) each of the teeth comprises a tab inserted into the groove.

18. The disk clamp as recited in claim 16, wherein each of the teeth comprises a crown member for use in deflecting the teeth away from the shaft when installing the disk clamp during manufacture of the disk drive.

19. The disk clamp as recited in claim 16, wherein the outer ring-shaped surface abutting the disk comprises a raised curve surface.

20. The disk clamp as recited in claim 19, wherein the ring-shaped body further comprises a circumferential rim adjacent the raised curve surface, the circumferential rim providing a latching surface for an insertion tool used to install the disk clamp during manufacture of the disk drive.

* * * * *